Patented May 24, 1949

2,470,829

UNITED STATES PATENT OFFICE 2,470,829

PROCESSES FOR BREAKING OIL-IN-WATER EMULSIONS

Louis T. Monson, Alhambra, Calif., assignor to Petrolite Corporation, Ltd., Wilmington, Del., a corporation of Delaware No Drawing. Application August 2, 1946, Serial No. 687,959

29 Claims. (Cl. 252—341)

This invention relates to a novel process for resolving or separating emulsions of the oil-in-water class. Such emulsions comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field waters containing small proportions of crude petroleum oil relatively stably dispersed in water or brine are representative oil-in-water emulsions.

Other oil-in-water emulsions include: steam cylinder emulsions, in which traces of lubricating oil are found dispersed in condensed steam from steam engines and steam pumps; wax-hexane-water emulsions, encountered in dewaxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate, produced in the catalytic dehydrogenation of butylene to produce butadiene; styrene-in-water emulsions, in synthetic rubber plants; synthetic latex-in-water emulsions, in plants producing a co-polymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol in the dehydration of natural gas.

In other industries and arts, emulsions of oily materials in water or other non-oily media are encountered, for example in sewage disposal operations, synthetic resin emulsion paint formulation, milk and mayonnaise processing, marine ballast water disposal, furniture polish formulation. In cleaning the equipment used in processing such products, diluted oil-in-water emulsions are inadvertently, incidentally, or accidentally produced.

Essential oils comprise non-saponifiable materials like terpenes, ketones, and alcohols. They also contain saponifiable esters, or mixtures of non-saponifiable and saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible.

The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, or a mixture of non-saponifiable and saponifiable materials. The present application is in part concerned with the resolution of emulsions in which the dispersed phase consists of a certain class of non-saponifiable material, to wit, petroleum oil.

A second sub-genus comprises emulsions whose dispersed phases are saponifiable, such as the saponifiable oils and fats and fatty acids, and other saponifiable oily or fatty esters and the organic components of such esters to the extent such components are immiscible with aqueous media.

A third sub-genus possesses dispersed phases composed of a mixture of saponifiable and non-saponifiable materials. Emulsions produced from certain blended lubricating compositions containing both mineral and vegetable oil ingredients exemplify this sub-genus. Such emulsions are resolved by the present process, particularly when the proportion of dispersed phase is appreciably less than 20%.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of oil phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of the invention have contained about 1% or less of dispersed phase. It is to such oil-in-water emulsions having dispersed phase volumes of the order of 1% or less that the present process is most particularly directed. This does not mean that any sharp line of demarcation exists, and that, for example, an emulsion containing 1.0% dispersed phase will respond to the process, whereas one containing 1.1% of the same dispersed phase will remain unaffected; but that, in general, dispersed phase proportions of the order of 1% or less appear most favorable for the application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of defined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

Classifying the oil-in-water emulsions herein contemplated, on the basis of their dispersed phase, the first division would include emulsions containing up to 20% of dispersed phase. An intermediate group would contain up to 5% dispersed phase. The third, herein most important, and commonest class would comprise emulsions in which the proportion of dispersed phase is less than about 1% of the whole.

The present process is not believed to depend for its effectiveness on the application of any simple laws, because it has a high level of effectiveness when used to resolve emulsions of widely different composition, e. g., crude or refined petroleum in water or diethylene glycol, as well as emulsions of oily materials like animal or vegetable oils or synthetic oily materials, in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are not the result of deliberate procedural operations, but which are either naturally-occurring or are accidentally, unintentionally, or unavoidably produced. Such emulsions are commonly of the most dilute type, and usually contain about 1% or less of dispersed phase, although concentrations up to 20% are herein contemplated.

The present invention relates particularly to such naturally-occurring or accidentally, unintentionally, or unavoidably produced emulsions, i. e., such emulsions as would not appear in industrial operations if avoidable. It relates particularly to such emulsions wherein the dispersed phase comprises less than 20% of the whole. Such dilute and naturally-occurring or accidentally, unintentionally, or unavoidably produced emulsions of by-product character will be termed herein "dilute incidental" emulsions, to distinguish them from more concentrated emulsions and emulsions intentionally produced.

Applicability of the present process can be readily determined by direct trial on any emulsion, without reference to theoretical considerations. This fact facilitates its application to naturally-occurring emulsions, or to emulsions accidentally, unintentionally, or unavoidably produced; since no laboratory experimentation, to discover the nature of the emulsion components or of the emulsifying agent, is required.

The process which constitutes the present invention consists in subjecting an emulsion of the oil-in-water class, containing less than about 20% of dispersed phase, to the action of a reagent or demulsifier of the kind subsequently described, thereby causing the oil particles in the emulsion to coalesce sufficiently to rise to the surface (or to settle to the bottom, if the oil density is greater than the water density), when the mixture of emulsion and reagent is allowed to stand in a quiescent state after mixing or treatment of emulsion with demulsifier.

The reagents employed in the present process consist of acylated aminoalcohols in which an acyloxy radical derived from a detergent-forming acid having from 8 to 32 carbon atoms is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated as demulsifiers are well known compounds and are produced by conventional procedures. Stated another way, the compounds herein contemplated are esters of aminoalcohols which may contain ether linkages as well as more than one amino nitrogen atom.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts, and the anhydro base, as well as the hydrated base, since both obviously are present when a water-continuous emulsion is treated with an amine or amino compound. ("In an aqueous solution of the amine, the anhydro base, R—NH$_2$, the hydrated base, R—NH$_3$—OH, and the two ions are all present." Richter, s. v., page 252.)

As has been previously stated, the reagents or demulsifiers herein contemplated for employment in the present process are old and well known products. For convenience and for purpose of brevity, reference is made to the following three United States patents, to De Groote and Keiser, to wit: No. 2,324,488, No. 2,324,489, and No. 2,324,490, all dated July 20, 1943. Said patents are concerned with processes for breaking water-in-oil emulsions. The demulsifying agent employed is in each instance the resultant derived by reaction between a certain fractional ester and an acylated aminoalcohol. The aminoalcohols described collectively in the aforementioned three patents are used as reactants for combining with a fractional acidic ester. Thus, said aminoalcohols must have present an alcoholiform hydroxyl as part of an acyl radical, or as part of a substituent for an amino hydrogen atom. In the instant case, such aminoalcohols are not employed as reactants except as to salt formation reactions, and the hydroxyl group is not functional. Thus, one may employ, not only the aminoalcohols described in the three aforementioned United States patents, but also the obvious analogues in which there is no hydroxyl radical present. Subsequent reference will be made to this particular type and examples will be included.

Aforementioned U. S. Patent No. 2,324,488 described hydroxylated acylated amino-ether compounds, containing:

(a) A radical derived from a basic hydroxy-amino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyamino-ether radical being characterized by containing not more than 60 carbon atoms; and (b) An acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical.

Aforementioned U. S. Patent No. 2,324,489 describes hydroxylated acylated monoamino compounds free from ether linkages, said hydroxylated acylated amino compounds being of the following type:

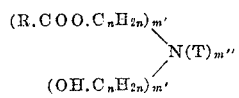

in which R.COO represents the oxy-acyl radical derived from a monobasic detergent-forming acid; T represents a member of the class consisting of hydrogen atoms, non-hydroxyl hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1 or 2; and $m''$ represents the numeral 0, 1 or 2; with the proviso that $m+m'+m''=3$.

Aforementioned U. S. Patent No. 2,324,490 describes basic hydroxylated acylated polyamino compounds free from ether linkages, said compounds being of the following formula:

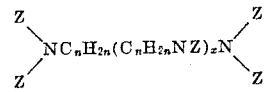

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower-molecular-weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) Acyloxyalkylene radical in which the acyl group is RCO; and (b) Joint occurrence of an amino radical in which the acyl group is RCO and a hydroxyalkyl radical.

A description of certain high molal monocarboxy acids, and more particularly, those commonly referred to as detergent-forming monocarboxy acids, appears in all three of the aforementioned U. S. patents. For convenience, the following description is substantially a verbatim form of the same subject-matter as it appears in U. S. Patent No. 2,324,490.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The composition of matter herein described and employed as the demulsifier of the present process, is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soybean oil, etc. The preferred demulsifier is obtained from unsaturated fatty acids, and more especially, from unsaturated fatty acids containing a hydroxyl radical, or unsaturated fatty acids which have been subjected to oxidation. In addition to synthetic carboxylic acids obtained by the oxidation of paraffins or the like, there is the somewhat analogous class obtained by treating carbon dioxide or carbon monoxide with steam or by causing a halogenated hydrocarbon to react with potassium cyanide and saponifying the product obtained. Such products or mixtures thereof, having at least 8 and not more than 32 carbon atoms and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The demulsifying agent employed in the present process consists of an aminoalcohol ester, as described; and particular attention is called to the fact previously noted, that although such esterified aminoalcohol need not contain a hydroxyl radical, the preferred form is the hydroxylated type. Other aminoalcohol esters of the kind herein contemplated are described in U. S. Patent No. 2,259,704, dated October 21, 1941, to Monson and Anderson.

In light of what has been said, it hardly appears necessary to include a list of reactants and reagents derivable therefrom. However, for convenience, the following amines are included. Suitable primary and secondary amines, which may be employed to produce materials of the kind above described, include the following: Diethanolamine, monoethanolamine, ethyl ethanolamine, methyl ethanolamine, propanolamine, dipropanolamine, propylpropanolamine, etc. Other examples include cyclohexylolamine, dicyclohexylolamine, cyclohexylethanolamine, cyclohexylolpropanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Tiethanolamine, diethanolalkylamines such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyl diethanolbenzyldipropanolamine, tripentanolamine, trihexanolamine, hexyldiethanolamine, octadecyldiethanolamine, etc.

Additional amines include ethanoldiethylamine, propanoldiethylamine, ethanoldipropylamine, propanoldipropylamine, ethanoldicyclohexylamine, cyclohexanoldiethanolamine, dibenzylethanolamine, etc. Ether-type aminoalcohols may be obtained from the above-mentioned aminoalcohols, for example, by treating them with one or more moles of an oxyalkylating agent such as ethylene oxide, propylene oxide, butylene oxide, glycide, etc. It is to be noted that comparable products are obtained by treating primary or secondary amines other than arylamines with an olefine oxide. Aminoalcohols containing a primary or secondary amino group, i. e., having at least one or two amino hydrogen atoms present, may be employed under especially controlled conditions to give an ester rather than an amide. One procedure is to permit amidification to take place and then cause a rearrangement to the ester form. See U. S. Patent No. 2,151,788, dated March 28, 1939, to Mauersberger.

AMINOALCOHOL ESTER

Example 1

One pound mole of ricinoleic acid is reacted with one pound mole of triethanolamine at approximately 180° to 240° C. for approximately 10 to 25 hours, until there is substantially complete esterification.

Example 2

Ricinoleic acid in the preceding example is replaced by methyl naphthenate.

Example 3

Methyl abietate is substituted for ricinoleic acid in Example 1, preceding.

Example 4

Ethyl oleate is substituted for ricinoleic acid in Example 1, preceding.

Example 5

One pound mole of triethanolamine is reacted with one pound mole of ethylene oxide and the etherized amine so obtained is substituted for triethanolamine in Examples 1 to 4, preceding.

Example 6

One pound mole of triethanolamine is reacted with two pound moles of ethylene oxide and the etherized amine so obtained is substituted for triethanolamine in Examples 1 to 4, preceding.

Example 7

One pound mole of triethanolamine is reacted with three pound moles of ethylene oxide and the etherized amine so obtaind is substituted for triethanolamine in Examples 1 to 4, preceding.

Example 8

One pound mole of triethanolamine is reacted with 4 to 6 pound moles of ethylene oxide and the etherized amine so obtained is substituted for triethanolamine in Examples 1 to 4 preceding.

Example 9

One pound mole of ethanoldiamylamine obtained by reacting one pound mole of diamylamine with one pound mole of ethylene oxide is employed in place of triethanolamine in Examples 1 to 4, preceding.

Example 10

The same procedure is employed as in the preceding example, except that an etherized amine is obtained by treating diamylamine with 2, 3 or 4 moles of ethylene oxide and such etherized amine is employed instead of ethanoldiamylamine.

Example 11

One pound mole of castor oil is reacted with 3 pound moles of triethanolamine, as described in aforementioned U. S. Patent No. 2,324,489, under the heading "Intermediate Hydroxylated Amine, Example 1."

Example 12

The same procedure is followed as in the preceding example, except that either one pound mole or two pound moles of glycerol are added to the reaction mass consisting of one pound mole of castor oil and three pound moles of triethanolamine.

Example 13

The resultants obtained in Examples 1 to 4, preceding, are treated with equal molal ratios of an olefine oxide.

Example 14

One follows the directions of U. S. Patent No. 2,293,494, to De Groote and Keiser, dated August 18, 1942, to produce an amine of the following composition:

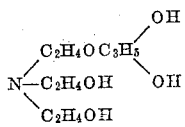

Such amine is substituted for triethanolamine in the preceding examples.

Example 15

One pound mole of hydroxethyl ethylenediamine is reacted with 4 moles of ethylene oxide to give the corresponding tetrahydroxylated derivative. Such compound is employed in place of triethanolamine in the preceding examples.

Example 16

The same procedure is followed as in the preceding example, except that 5 to 8 moles of ethylene oxide are employed instead of 4 moles.

Example 17

The same procedure is employed as in the preceding example, except that diethylenetriamine is substituted for ethylenediamine.

Example 18

Amines of the following composition:

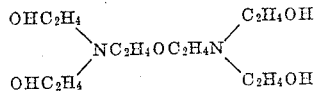

and

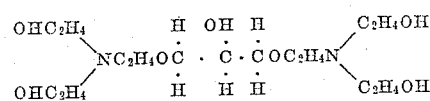

are substituted for ethylenediamine in the preceding examples.

Example 19

In the preceding examples, where more than one high molal acyl radical can be employed, two ricinoleyl radicals or the equivalent are introduced into the polyaminoalcohol.

Example 20

Unsymmetrical diphenyl diethylenetriamine is treated with ethylene oxide and substituted for oxyethylated ethylenediamine in the preceding examples.

Example 21

Symmetrical diacetyl triethylenetetramine is treated with 4 moles of ethylene oxide and substituted for oxyethylated ethylenediamine in the preceding examples.

Example 22

Additional examples are prepared in the manner previously described, except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris(hydroxymethyl)aminomethane; or piperidine. One may use enough of the olefine oxide, for instance, ethylene oxide, to convert all amino hydrogen atoms into hydroxyethyl radicals, or one may employ a greater amount so as to introduce ether linkages in addition.

Example 23

The same procedure is followed as in Example 22, preceding, except that one employs the amines described in Examples 9, 10, 11 and 13 of U. S. Patent No. 2,306,329, to De Groote and Keiser, dated December 22, 1942.

Example 24

Soybean oil, blown soybean oil, blown castor oil, or blown teaseed oil is substituted for castor oil in the preceding examples.

In the above examples it is obvious that free hydroxyl radicals may be present as part of a hydroxyalkyl radical or as part of the acyl radical of a fatty acid, such as ricinoleic acid.

Some of the acylated amino-bodies contemplated for use in the present process are freely dispersible in water in the free state. Presumably such systems comprise the reagent in the form of a base, i. e., a substituted ammonium compound. In other instances, the free forms of the reagents are substantially water-insoluble, but the salt forms (e. g., the acetates) are very water-dispersible. In some instances, the reagent in free form is introduced into an emulsion whose aqueous phase is acidic. In some instances, therefore, the reagent is more desirably employed in the form of one of its salts. For example, the acetate, hydroxyacetate, lactate, gluconate, propionate, caprate, phthalate, fumarate, maleate, benzoate, succinate, oxalate, tartrate, chloride, nitrate, or sulfate, prepared by addition of the suitable acid to the acylated amino body, has been found to constitute a reagent which is usually somewhat more soluble or dispersible in water than the original acylated amino body, and which is, if anything, slightly more effective than the simple acylated amino body, when used in the present process. In such instances, where the simple acylated amino body is not particularly water-dispersible, it may still be possible to employ it in free form and without preparing a salt form, by using some non-aqueous solvent, such as aromatic petroleum solvent, instead of water; or, in instances where the emulsion to be resolved includes an acidic aqueous phase, the salt form may be produced in situ by simply adding the reagent in free form to such acidic emulsion. It is to be understood that references to the demulsifying reagents in these specifications and claims include the amino bodies in basic form and in the form of salts of acids, as well as the amino bodies themselves.

As an example of a preferred type of reagent which is effective for use in the present process, the following is submitted: A mixture of diamino and triamino materials is prepared, which correspond essentially to the two following type forms:

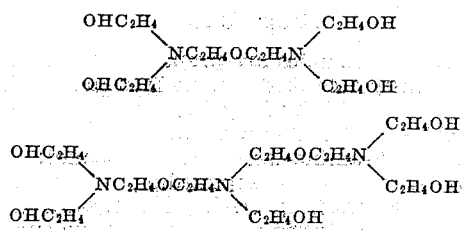

After determining the average molecular weight of such mixture, it is combined with castor oil in the proportion of 1 pound mole of castor oil for 3 pound moles of the mixed amines, "pound mole" in the latter case being calculated on the average molecular weight, as determined. Such mixture is heated to approximately 160–260° C. for approximately 6 to 25 hours, until reaction is complete, as indicated by the disappearance of all of the triricinolein present in the castor oil. The finished product may be used as such, but because of its appreciable viscosity, it may be desirable to mix it with any desired proportion of water or other solvent. It has been found, for example, that a mixture of 20 parts of the above reagent and 80 parts of water has physical properties which are in some respects superior to those of the concentrated material.

It is apparent, from an inspection of the above formulae, that they represent dimeric and trimeric polymerized forms of triethanolamine. Products similar to, if not identical with, those just recited, may therefore be obtained by heating together 1 pound mole of castor oil and 6 or 9 pound moles of triethanolamine, depending upon whether an acylated derivative of the aminoalcohol of the first or the second formula above is to be produced.

As stated above, the material may be employed in the concentrated form, or it may be diluted with a suitable solvent. Water has frequently been found to constitute a satisfactory solvent, because of its ready availability and negligible cost; but in other cases non-aqueous solvents, such as aromatic petroleum solvent, have been employed in preparing reagents which were effective when used for the purpose of resolving oil-in-water emulsions. Depending upon the choice of acylated amino body and its molecular weight, the solubility may be expected to range from ready water-solubility in the free state to substantial water-insolubility. As stated above, the salts, and especially the acetates, generally show improved water-solubility over the simple acylated amino bodies; and the best results have been obtained by using salt forms of the acylated amino bodies which possess appreciable water-solubility. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

It should be pointed out that the superiority of the reagent contemplated in the present process is based upon its ability to separate the oil phase from certain oil-in-water class emulsions more advantageously and at lower cost than is possible with other reagents or other processes. In certain instances, it has been found capable of resolving emulsions which were not economically or effectively resolvable by any other known means.

In one application of the present process, an oil lease was producing some 2,800 barrels of crude oil daily, along with some 18,000 barrels of oil-in-water emulsion having an oil contact of approximately 1,000 parts per million. State authorities had prohibited the discharge of the water into the stream contiguous to the lease; and all efforts economically and efficiently to clean the water of the small proportion of oil had failed. The expedients in use at the time the present process was introduced involved the production of a floc or slime which swept out some of the oil particles as it came to the surface; skimming said slime; burning such oil-soaked slime so far as possible; and disposing of the remainder by trucking it to some suitable disposal spot. Oil recovered from the pits or sumps in which said process was being employed carried residual amounts of such slimes, which interfered with the subsequent treatment of said oil, and particularly with its dehydration. The daily cost of such expedients frequently exceeding $100, and probably averaged $50–75. Even then, the water discharged frequently contained 100 parts per million of oil, which was considered unsatisfactory. By the use of 9 gallons of the present reagent (less than 12 parts per million, of the reagent) the water was cleaned until it contained as little as 5 parts per million of oil after treatment. The cost of conducting the present process was less than $20 a day, ignoring oil recovered.

In another application of the present process, an oil-producing lease in another field was delivering, along with crude oil, an oil-in-water emulsion containing approximately 8,000 parts per million (P. P. M.) oil. This oil-in-water emulsion was resolved by the present process so that the water discharged contained only several hundred parts per million after very brief settling. After the sedimentation time was increased, even this small percentage of residual oil was lowered, and the effluent water contained less than 80 P. P. M. oil. This represents a removal of more than 99% of the oil originally dispersed in the water.

In another instance, application of the present reagent resolved a crude-oil-in-water emulsion containing some 4–5% oil, and permitted delivery of clear water to waste.

In some of these oil-field installations, where efficient operation is had, the effluents carry as little as 5 P. P. M. oil or even less. An effluent carrying 25 P. P. M. or less of oil is not unusual in such applications of the present process, even though no special apparatus or equipment is installed, and the water disposal plants are operated just as they were before introduction of the reagent of the present process.

In a butadiene manufacturing operation, employing heavy petroleum naphthas as raw material and a conventional gas-making plant, the wash box circulating water became badly fouled with the butadiene tar and residual oils from the gas-making operation. In such condition it constituted a distinctly unsatisfactory medium. Its odor was so intense and its content of oily constituents so strongly stain-producing, that abandonment of use was contemplated. Application of the present reagents resulted in resolution of the emulsion, and the recovery of clear water.

In another plant, butylene is passed over a catalyst bed along with steam and a hydrocarbon oil, for the purpose of producing butadiene by dehydrogenation of the butylene. Condensation of the steam in the presence of the oil causes the formation of an oil-in-water emulsion containing up to some 5,000 parts oil per million of water. Addition of the present reagent in proportions approximately 10–20 parts, per million of emulsion, produced a substantially complete stratification of oil and a transparent aqueous layer containing only several P. P. M. oil.

An oil-in-water emulsion comprising petroleum wax, hexane, and water occurs in the de-waxing of petroleum distillates by means of hexane. Such an emulsion has been subjected to a small proportion of the present reagent, with consequent resolution of the emulsion and production of a clear aqueous layer.

Steam cylinder emulsions produced in the lubrication of steam-actuated engines and pumps have been subjected to the action of the present reagent, employing very small proportions of such reagent (of the order of about 10 P. P. M. or less), with favorable results. The water separates in a clear aqueous layer, in such procedures.

In a plant producing GRS-type synthetic rubber by co-polymerizing butadiene and styrene, it was found that decanter water in the styrene system carried small proportions of styrene, emulsified in such water. Application of a minute proportion of the present reagent resolved such emulsions satisfactorily, a clear water being obtained.

Synthetic latex emulsions were passed to waste in the same co-polymer plant when water was used to flush working areas, the waste water being exceedingly milky in appearance because of the presence of dispersed particles of synthetic rubber latex. Introduction of a small proportion of the present reagent into the emulsion produced a clear water effluent.

The cooling water systems of two natural gasoline absorption plants comprised dilute emulsions of absorption oil in water, at the time the present reagent was applied in small proportions to such emulsions. Complete resolution of the emulsions, with the production of oil and a clear aqueous layer, resulted from such application of such reagent, in both instances.

Several examples of emulsion in which oily materials were dispersed in the diethyleneglycol used to dehydrate natural gas were subjected to the present reagent, for example, in proportions less than about 0.1%. The emulsified materials formed a bottom layer within several hours, the supernatant glycol being clear and bright, showing its freedom from dispersed particles. Settling is appreciably accelerated by the application of heat, since diethyleneglycol has an appreciable viscosity.

A dilute furniture polish emulsion, when subjected to reagents of the present invention, was resolved into a clear aqueous layer and an oily top layer. The original emulsion contained petroleum hydrocarbon oil and an emulsifier of unknown composition.

A pipe press water, obtained in the manufacture of clay pipe in a steam-actuated press, carried a minor proportion of oil and some clay. Subjection to a small proportion of the present reagent resolved the emulsion system, and produced a clear aqueous layer.

A dilute dispersion of a commercial emulsified resin paint was subjected to the action of the present reagent. The opaque milky emulsion separated a clear aqueous layer, in a short time, although only very small proportions of demulsifier were used.

A sample of diluted cow's milk was subjected to the action of a small proportion of the present reagent, resulting in the separation of a clear aqueous layer.

A sample of diluted mayonnaise was likewise subjected to the action of a small proportion of the present reagent, resulting in the separation of a clear aqueous layer, on standing.

While heat is often of little value in improving results when the present process is practised, still there are instances where the application of heat is distinctly of benefit. The example involving diethyleneglycol, above, has already described one such instance. Others could be cited. For example, in one application of the present process to the resolution of an emulsion of crude petroleum in water, it was found that operating the system just 20° F. warmer—at 128° F. instead of 108° F.—notably improved the results obtained. In some instances, adjustment of the pH of the emulsion to an experimentally determinable optimum value, will materially improve the results obtained in applying the present process.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion are standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

As an added discovery, it has been found that application of a suitable gas in a procedure approximating that of the froth flotation cell employed in ore beneficiation, after the present reagent has been added to the emulsion to be resolved, frequently has a favorable influence of totally unexpected magnitude. For example, in the case of the butadiene-plant circulating water emulsion mentioned above, application of the present reagent in the proportion of about 1 part to 10,000 parts of emulsion was required to produce a clear aqueous layer from a sample of emulsion, on several hours' standing. By incorporating the step of subjecting the chemicalized emulsion to the action of air in a sub-aeration type flotation cell, a clear aqueous layer was obtained in a matter of seconds, without added quiescent settling, and with approximately $\frac{1}{10}$ as much reagent. Natural gas was found to be as good a gaseous medium as was air, in this operation.

In another application of the aeration technique, a sample of the same emulsion was subjected to the present reageant and the mixture was stirred by paddle. (Actually, the impeller of the flotation cell was used, without permitting the air to flow into the cell from the hollow impeller shaft.) No resolution of the emulsion occurred over several minutes of stirring. Within about 10 seconds after the air was turned into the stirring mixture, by opening the air valve on the hollow impeller shaft, the emulsion was resolved, and the bottom of the flotation cell was visible through the clear aqueous layer produced.

The same favorable effect of aeration was noted in procedures employed in the resolution of the styrene-in-water emulsions mentioned above. The effect of the application of air was to produce almost instantaneously a clear aqueous layer from the chemicalized emulsion.

It should be distinctly understood that such aeration technique, while an important adjunct to the use of the present reagent, in some cases, is not an equivalent procedure. This has been proved by subjecting an un-chemicalized emulsion to aeration for a period of minutes without detectable favorable effect. Addition of the reagent to such aerated emulsion did produce resolution, promptly.

The details of the mechanical structures required to produce aeration suitable for the present purpose need not be given here. It is sufficient to state that any means capable of producing small gas bubbles within the body of the emulsion is acceptable for use. This may be a sub-aeration flotation cell, as mentioned in the foregoing examples. It may be a porous plate, such as a Filtros plate or an Aloxite plate, connected to a source of gas; the gas being delivered into the liquid as bubbles from the pores of such plate, preferably located at or near the bottom of the vessel in which the emulsion is contained. If such plates are used, it is possible to design apparatus in which continuous flow of the chemicalized emulsion over the plate system is realized, the tailings discharge from such apparatus being a clear aqueous liquid, the oil phase being taken off by skimming troughs or other arrangements located within the flotation vessel.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U. S. Patent No. 1,505,944, and Bailey, in U. S. Patent No. 1,770,476. Neither of these patents discloses or suggests the present invention, as may be seen from an inspection of their contents.

Suitable aeration is sometimes obtainable by use of the principle of Elmore, U. S. Patent No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description. However, for completeness, the following specific example is included. The emulsion is introduced into a sub-aeration type flotation cell in which an impeller is mounted vertically on a hollow shaft which in turn carries an air valve of suitable design. The air valve may conveniently consist of a short length of solid rod of diameter equal to that of the outside diameter of the hollow shaft, which rod has been turned, over a portion of its length, to a diameter slightly less than the inside diameter of the hollow shaft. It may thereby be inserted into said hollow shaft, and serve to exclude air from said shaft. When it is desired to introduce air into said hollow shaft, the rod plug is simply lifted from the shaft in any desired manner, e. g., by hand. The hollow shaft carries, at its lower end, a number of radially disposed vanes or paddles. Between the intersections of these respective paddles and the hollow shaft, small holes are drilled into the shaft. When the shaft is rotated at appreciable speeds by any suitable source of power, such as an electric motor, air is drawn down the hollow shaft, escapes through these holes, and is beaten into still smaller particles by the action of the paddles. The air then makes its way to the surface, carrying with it the particles of oily dispersed material originally present in emulsified form, when the present reagent is present in the system. Suitable baffles may be positioned in the vessel to achieve a reasonably quiescent collecting zone at the surface of the liquid, from which the accumulation of oil-bearing froth is removed, e. g., by skimming.

In operating this process, it is preferred that the reagent be added to the emulsion in the cell, and the impeller started with the air valve closed. This causes the reagent to contact the emulsified particles. After a short period of such conditioning, the air valve is opened. The separation of the dispersed oil particles then takes place rapidly.

The chemicalizing or conditioning step may be achieved in other ways. For example, if the emulsion is pumped to the flotation cell through a pipe, the reagent may be introduced into said pipe by any suitable proportioning means, such as a proportioning pump. Motion of the liquid through the pipe is commonly sufficient to admix the reagent and the emulsion; so that, when the liquid reaches the cell, aeration may be started at once.

It will be apparent from the foregoing description that the order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. One of the examples above noted contemplates the use of natural gas. Other commonly suitable gases include nitrogen, carbon dioxide, oxygen, etc., the gas being used essentially for its levitation effect. If any gas has some deleterious effect on any component of the emulsion, it will obviously be desirable to use instead some gas which is inert under the conditions of use.

In summary, attention is directed to the fact that the amino compounds herein contemplated may be monoamino or polyamino in type. They may or may not have a free hydroxyl radical present. There must be present an acylated derivative of the radical $H(OR')_nN<$, in which there is at least one occurrence of the radical RCO, which is, in turn, the acyl radical of a monocarboxy detergent-forming acid having at least 8 and not more than 32 carbon atoms; and the amino nitrogen atom must be basic, i. e., free from direct linkage with an unsaturated or negative radical such as an acyl radical or an aryl radical. The R' is an alkylene radical having at least two and not more than 10 carbon atoms, and preferably 2, 3 or 4 carbon atoms. The alkylene radical may be considered as being derived from an olefine oxide such as those previously mentioned. Additional reactive olefine oxides are described in U. S. Patent No. 2,208,581, to Hoeffelman, and dated July 23, 1940, and include among others glycide, hexylene oxide, decene oxide, etc. The character $n$ indicates a number varying from 1 to 10, but preferably from 1 to 4. Recurrences of R' need not be the same. For instance, one mole of triethanolamine might be reacted with three moles of ethylene oxide, and the resultant with three additional moles of propylene oxide, and the resultant product so obtained may be reacted with three moles of butylene oxide. The aminoalcohol so obtained could be esterified in the manner previously described. It is obvious, of course, that where $n$ is 2 or more, the product is in essence an esterified aminoetheralcohol, the expression etheralcohol being frequently applied to alcohols where a carbon atom chain is interrupted at least once by an oxygen atom. Ether linkages may appear in other positions, where there is no direct union with RCO.

The simplest compound herein contemplated is the octenoic acid ester of ethanoldimethylamine. On the other hand, one may have polyamino compounds having 4, 5 or 6 amino nitrogen atoms and containing in addition as many as 4 acyl radicals derived from high molal acids having as many as 32 carbon atoms. Thus, the molecular weight range of the monomeric form may vary from 213 to 10 or 20 times such value. The ease with which heat polymerization of polyhydric alcohols and polyhydric aminoalcohols takes place suggests that condensation polymers obtained by etherization may have a substantially higher molecular weight.

Reference has been made to the use of glycide, epichlorhydrin, etc., as an oxyalkylating agent. Reference has also been made to reactions which involve etherization in which glycerol appears as a reactant. Thus, R', previously referred to as being an alkylene radical, such as ethylene, propylene, etc., obviously includes radicals obtained from glycerol or glycide, i. e., the hydroxy propylene radical. Hence, in the hereto appended claims, reference to the propylene radical, either generically or specifically, is intended to include the hydroxypropylene radical as well.

Attention is directed to the fact that in the hereto appended claims, the proviso that an ether linkage be present does not mean that the ether linkage must necessarily occur in the radical by which the acyl radical RCO is joined to the nearest basic nitrogen atom. For instance, compare the last two previous formulae preceding and note that the introduction of an acyl radical is such that the acyloxy radical is joined to, or united to, a basic amino nitrogen atom by an uninterrupted carbon atom chain. Thus, reference in the hereto appended claims to an ether radical includes both types of ether linkages, i. e., the type where the ether linkage is part of the radical linking RCO to the nearest basic amino nitrogen atom and in such instances where the ether radical does not represent part of the linking radical which unites RCO to the nearest basic amino nitrogen atom.

This application is a continuation-in-part of my copending application Serial No. 508,093, filed October 27, 1943, later abandoned.

Having thus described my invention, what I claim as new and desire to secure by Letters Patent is:

1. A process for breaking oil-in-water emulsions, in which the dispersed phase is a petroleum oil and is not greater than 20%, characterized by subjecting the emulsion to the action of a reagent comprising an acylated derivative of a basic aminoalcohol of the formula:

said acylated derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO is a substituent for a hydroxyl hydrogen atom; and the molecular weight of said compound in monomeric form is at least 213 and not over 4,000; said amino compound being selected from the class consisting of the anhydro base, the hydrated base, and salts.

2. A process for breaking oil-in-water emulsions, in which the dispersed phase is a petroleum oil and is 1% or less, characterized by subjecting the emulsion to the action of a reagent comprising an acylated derivative of a basic aminoalcohol of the formula:

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO is a substituent for a hydroxyl hydrogen atom; and the molecular weight of said compound in monomeric form is at least 213 and not over 4,000; said amino compound being selected from the class consisting of the anhydro base, the hydrated base, and salts.

3. The process of claim 1, wherein the reagent contains, per monomer, more than one basic amino nitrogen atom.

4. The process of claim 1, wherein the petroleum oil is crude petroleum and wherein the reagent contains, per monomer, at least 2 and not more than 4 basic amino nitrogen atoms and at least one free hydroxyl radical.

5. The process of claim 1, wherein the petroleum oil is crude petroleum and wherein the reagent contains, per monomer, at least 2 and not more than 4 basic amino nitrogen atoms and a plurality of free hydroxyl radicals.

6. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical.

7. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom.

8. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical.

9. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radcal in a position other than part of the divalent linking radical which unites RCO with the nearest basic amino nitrogen atom; and wherein RCO is an unsaturated higher fatty acid acyl radical having 18 carbon atoms.

10. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO, occurring only once per monomer, is an unsaturated higher fatty acid acyl radical having 18 carbon atoms.

11. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is an unsaturated higher fatty acid acyl radical having 18 carbon atoms; and wherein the value of $n$ is unity.

12. The process of claim 1, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is an unsaturated higher fatty acid acyl radical having 18 carbon atoms; and wherein the value of $n$ is unity, and R' is an alkylene radical having at least 2 and not more than 3 carbon atoms.

13. The process of claim 2, wherein the petroleum oil is crude petroleum and wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is the ricinoleyl radical; and wherein the value of $n$ is unity, and R' is an alkylene radical having at least 2 and not more than 3 carbon atoms.

14. A process for breaking emulsions composed of oil dispersed in a non-oily continuous phase, in which the dispersed phase is not greater than 20%, characterized by subjecting the emulsion to the action of a reagent comprising an acylated derivative of a basic aminoalcohol of the formula:

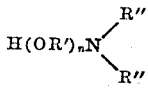

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO is a substituent for a hydroxyl hydrogen atom; and the molecular weight of said compound in monomeric form is at least 213 and not over 4,000; said amino compound being selected from the class consisting of the anhydro base, the hydrated base, and salts.

15. A process for breaking oil-in-water emulsions, in which the dispersed phase is not greater than 20%, characterized by subjecting the emulsion to aeration and to the action of a reagent comprising an acylated derivative of a basic aminoalcohol of the formula:

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; n is a small whole number varying from 1 to 10; RCO is a substituent for a hydroxyl hydrogen atom; and the molecular weight of said compound in monomeric form is at least 213 and not over 4,000; said amino compound being selected from the class consisting of the anhydro base, the hydrated base, and salts.

16. A process for breaking oil-in-water emulsions in which the dispersed phase is not greater than 1%, characterized by subjecting the emulsion to aeration and to the action of a reagent comprising an acylated derivative of a basic aminoalcohol of the formula

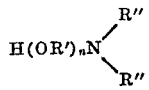

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxy alkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; n is a small whole number varying from 1 to 10; RCO is a substituent for a hydroxyl hydrogen atom; and the molecular weight of said compound in monomeric form is at least 213 and not over 4,000; said amino compound being selected from the class consisting of the anhydro base, the hydrated base, and salts.

17. The process of claim 16, wherein the reagent contains, per monomer, more than one basic amino nitrogen atom.

18. The process of claim 16, wherein the reagent contains, per monomer, at least 2 and not more than 4 basic amino nitrogen atoms and at least one free hydroxyl radical.

19. The process of claim 16, wherein the reagent contains, per monomer, at least 2 and not more than 4 basic amino nitrogen atoms and a plurality of free hydroxyl radicals.

20. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom.

21. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical.

22. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is an unsaturated higher fatty acid acyl radical having 18 carbon atoms.

23. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO, occurring only once per monomer, is an unsaturated higher fatty acid acyl radical having 18 carbon atoms.

24. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is an unsaturated higher fatty acid acyl radical having 18 carbon atoms; and wherein the value of n is unity.

25. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is an unsaturated higher fatty acid acyl radical having 18 carbon atoms; and wherein the value of n is unity, and R' is an alkylene radical having at least 2 and not more than 3 carbon atoms.

26. The process of claim 16, wherein the reagent contains, per monomer, at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once per monomer, is the ricinoleyl radical; and wherein the value of $n$ is unity, and R' is an alkylene radical having at least 2 and not more than 3 carbon atoms.

27. A process for the resolution of oil-in-water emulsions containing less than 1% of oil, which comprises subjecting the emulsion to the action of a water-dispersible reaction product of a fatty body and an alkylol polyamine having amino groups connected to different carbon atoms.

28. A process for the resolution of oil-in-water emulsions, which comprises subjecting the emulsion to the action of a water-dispersible reaction product of a substance selected from the group consisting of detergent-forming acids and their esters having at least 8 carbon atoms in an aliphatic carbon chain and an alkylol polyamine having amino groups connected to different carbon atoms.

29. A process for the resolution of oil-in-water emulsions, which comprises subjecting the emulsion to the action of a water-dispersible reaction product of a substance selected from the group consisting of unsaturated detergent-forming acids and their esters having at least 8 carbon atoms in an aliphatic carbon chain and an alkylol polyamine having amino groups connected to different carbon atoms.

LOUIS T. MONSON.

REFERENCES CITED

The following references are of record in the file of this patent:

UNITED STATES PATENTS

| Number | Name | Date |
| --- | --- | --- |
| 2,159,313 | Blair et al. | May 23, 1939 |
| 2,231,755 | De Groote et al. | Feb. 11, 1941 |